Patented June 22, 1926.

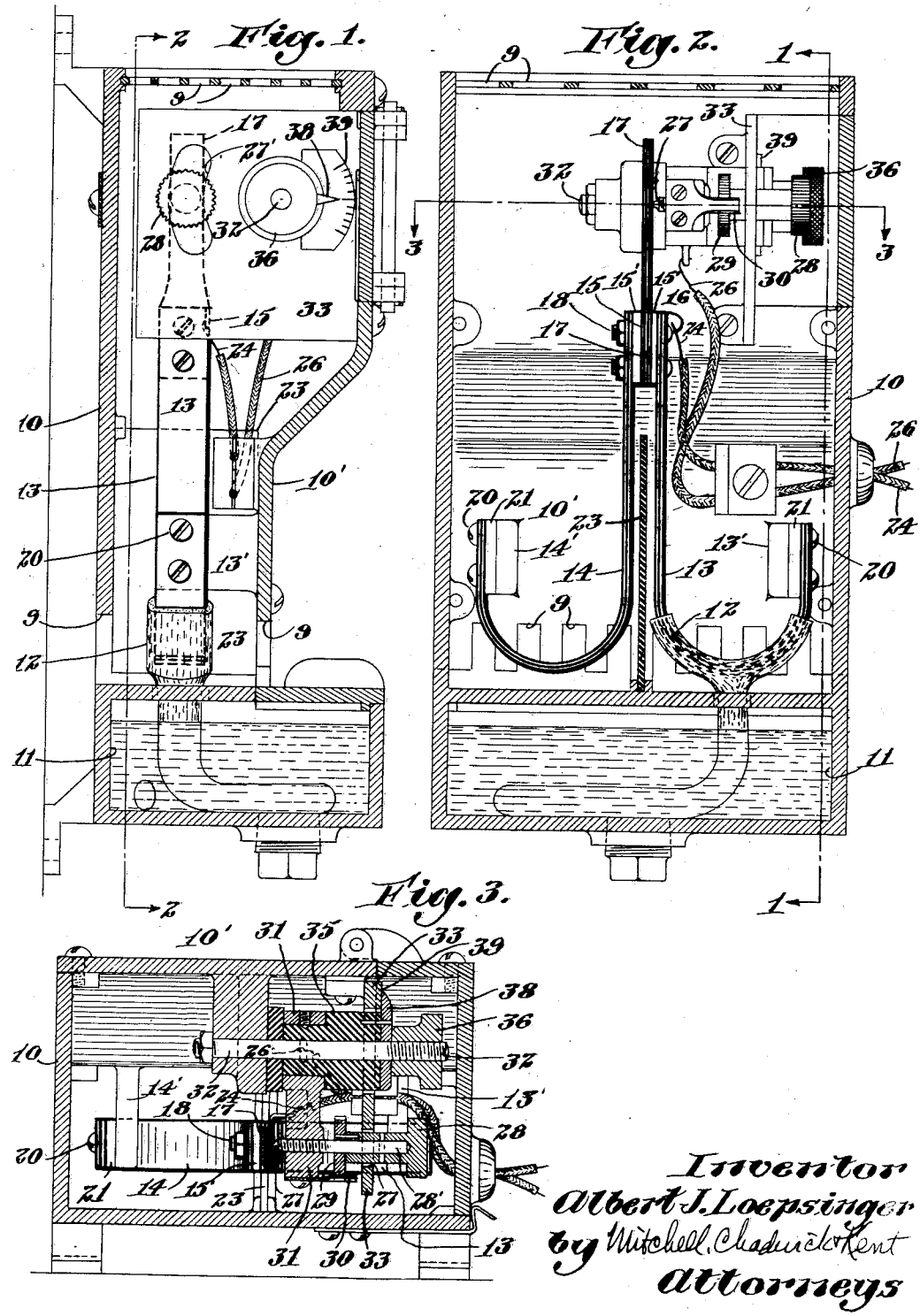

1,589,886

UNITED STATES PATENT OFFICE.

ALBERT J. LOEPSINGER, OF PROVIDENCE, RHODE ISLAND, ASSIGNOR, BY MESNE ASSIGNMENTS, TO GENERAL FIRE EXTINGUISHER COMPANY, OF PROVIDENCE, RHODE ISLAND, A CORPORATION OF DELAWARE.

HUMIDITY REGULATOR.

Application filed July 23, 1923. Serial No. 653,397.

This invention relates to improvements in humidity regulators. More particularly it relates to apparatus for controlling the restarting, stopping or setting of devices for affecting the humidity of air. The ultimate object may be to maintain certain desired moisture content in some certain fibrous material, as silk or cotton, or in some product, as tobacco, which is reached by turning on or turning off a suitable humidifying apparatus, or by setting a damper controlling inflow of moist or dry air, or the relative proportions thereof. The values of humidity in air and of the so called regain or humidity in fibers change with every change of temperature and none of them retain any fixed relation to wet bulb depression, or to each other; yet it is desirable to have apparatus which will maintain any one of these values constant at varying room temperatures. The various devices heretofore proposed for such control having been rather complicated and expensive, it is an object of the present invention to provide apparatus which shall be essentially simple but which can represent, combine and integrate the various conditions which prevail in a locality at any instant, as regards humidity and temperature, and can translate them into suitable controlling motor action for the humidifying apparatus, so that a predetermined standard shall be maintained of constant wet bulb depression; or of constant relative humidity; or of constant silk, wool, cotton or other regain, according to whatever law the instrument is designed or set to follow. Other objects are to provide apparatus which can be set so as to attain a high degree of accuracy and sensitiveness in its work, unaffected by mill vibration; which is rugged, and therefore durable; and which can be used according to various preferred methods for getting the wet bulb depression.

These objects are attained by providing two thermostatic elements, preferably metallic, one experiencing and reacting to dry bulb temperature and the other experiencing and reacting to wet bulb temperature. By making these equal and setting them with their moving ends, herein called their kinetic ends, parallel and extending in the same direction, but opposed to each other and secured together in fixed relation to each other, a resultant kinetic base is obtained whose effective motion is independent of room changes of temperature but which responds to changes of wet bulb depression. On this kinetic base is mounted a thermostatic tongue which responds to dry bulb changes of temperature by curvature. The whole may be so designed that points on this tongue may be found whose movements may be used for humidity control corresponding to every condition which may be selected, which it is desired to maintain constant, as, 70 per cent relative humidity, or 10 per cent cotton regain, notwithstanding variations which may occur in room temperature. That particular point on the tongue which corresponds to the selected condition integrates the constantly occurring differential changes of temperature and of humidity, in the room, in terms of the law governing the incidents of that selected condition; so that whenever the room temperature or the current wet bulb depression of the room changes, a certain correction is automatically superimposed on the resultant position of said kinetic base. This correction produces the ultimate result that the relation which the said tongue point bears to a certain cooperating fixed point, provided in the apparatus, accurately expresses the relation of the existing conditions in the room, in terms of wet bulb depression, to those conditions which would prevail there if the said selected law were being observed.

Thus, to take a simple illustration, if the integrating point occupies a position almost but not quite in contact with the fixed point it may be said to represent that the desired condition exists; and when it moves into contact with the fixed point its new position may correspond to an atmospheric condition requiring more humidity. This may be either because the absolute humidity in the atmospheric surroundings has fallen or because the temperature has risen. And when it moves further away from the said fixed point this motion may correspond to an increase of humidity due either to actual increase of absolute humidity or to reduction of temperature. The kinetic tongue carrying the moving point, is herein called an integrating tongue. Its physical attributes and connections, and those of the said fixed point, may be such that the movement or pressure of the one toward or from the other sets the humidifying apparatus into operation, or stops it, or changes the setting of some part such as a damper associated therewith. The agency employed for communication may be electricity or air or other as desired, arranged for control at said fixed point.

The said fixed point is preferably adjustable toward and from the integrating tongue, in order to fix the wet bulb depression to which the instrument responds at a point which is correct for the law of the chosen humidity condition, under the atmospheric conditions prevailing at the moment of setting. It preferably is adjustable along the tongue toward and from the kinetic base, in order thus to select a rate of correction which is in harmony with the law of the selected humidity condition, which the instrument is to maintain. The choice of materials for constituting the thermostatic members, or for constituting the integrating tongue, is to a considerable extent immaterial; but in so far as this is of consequence the choice may be varied according to the results desired.

I have demonstrated that the apparatus of the invention is capable of accomplishing these results by observing that a line of constant relative humidity, or of constant fibre regain, when plotted to coordinates of dry bulb and wet bulb temperatures, is substantially a straight line within those ranges of temperature in which the qualities under discussion are important factors in industry. These said lines are not parallel to each other nor to the lines of constant wet bulb depression; but each makes some certain small angle with the straight line of 100% relative humidity, which is also the line of zero wet bulb depression. All of the other lines of constant wet bulb depression are parallel with the line of zero wet bulb depression; and each particular line of constant relative humidity, or of constant regain, makes the same angle with every line of constant wet bulb depression. As temperature increases the line of 80 per cent relative humidity, for example, departs to a greater and greater distance from that line of constant wet bulb depression which passes through the point on such a chart that represents the wet bulb depression of the moment; but because the two lines are straight the rate of departure per degree of temperature increase is constant and the distance of departure therefore is proportional to the increase of temperature. A similar statement can be made regarding each other line of constant relative humidity or of constant regain, but their actual rates of departure will be different, because they each make a different angle with the parallel lines of constant wet bulb depression. The kinetic base of the apparatus of the invention will express the wet bulb depression of the moment; the distance at which the fixed point is set in its direction of travel may correspond to any certain value of wet bulb depression. The successive points along the curved integrating tongue of the invention move at different rates per degree of temperature change, changing with their several distances measured along the tongue from the kinetic base; but the distance to which any particular one of such points moves, as the integrating tongue curves with increase of temperature, is practically constant for that particular point per degree of temperature change. Hence if the apparatus be set with the fixed point in such relation to a kinetic point on the integrating tongue that it represents a known wet bulb depression which prevails at the moment, and if that kinetic point be selected whose rate of movement corresponds to the rate at which the line, which represents the law of the selected condition, for example, the law of 80 per cent relative humidity, departs from the line representing the law of constant wet bulb depression, the instrument will integrate in accordance with said condition. The relation of position between said kinetic integrating point and said fixed point will express the relation of the wet bulb depression which is current at the moment to the wet bulb depression which would be current if the said law were being observed. The existence or the non-existence of a prescribed distance between these two points may serve to start or stop the operation of mechanism by devices already known.

In the accompanying drawings, which show an illustrative embodiment of the invention:

Figure 1 is a side elevation of apparatus embodying the invention, in section on line 1—1 of Figure 2;

Figure 2 is a rear elevation of the same, in section on line 2—2 of Figure 1;

Figure 3 is a plan of the same, in section on the line 3—3 of Figure 2.

Referring to the drawings, 10 indicates the wall of the casing, in the bottom portion of which is a reservoir 11 for water, from which rises a wick 12 for the wet bulb basic thermostat 13; and the dry bulb basic thermostat is marked 14. In the particular form illustrated these thermostats are as identical as may be, in materials, dimensions, strength, and mounting, being each in U shape with one leg prolonged, set erect; and they are set in the same plane, with the prolonged legs parallel and secured together at their free ends where there is a composite block 15 made up of insulating plates 15', an electric contact sheet 16 and the base or root of a thermostatic tongue 17, all of which parts are clamped together with and between the adjacent legs of the basic thermostats 13 and 14 by screws 18. This composite block constitutes a kinetic base for the thermostatic tongue 17, supported by the basic thermostats 13, 14 which are in turn supported fixedly at the ends of their respective shorter legs. Screws may be employed, as illustrated at 20, to hold these thermostats securely on the respective projections 13′, 14′ of the removable front wall 10′ of the casing 10, with heat insulating plates 21. These thermostats may be made of ordinary bi-metallic sheet construction. In the plane of the integrating tongue, and midway between the adjacent legs of the basic thermostats, a heat insulating partition 23 is arranged. Thus an enclosure is provided for the wet bulb thermostat 13, which may be as complete an enclosure as experience or the particular design adopted may dictate. The integrating tongue 17 may preferably be arranged so as to be subject only to the influence of the atmospheric temperature, unaffected by the evaporation from the chamber 11 and wick 12. In the design illustrated there are orifices 9 at the top and bottom of the casing for free passage of air, so that the basic thermostats 13, 14 and the tongue 17 are surrounded by a sample of the air on which the apparatus is to work; except as this is affected, in case of the wet bulb thermostat 13 by evaporation from its wick. Other means suitable may be employed, if preferred, to insure the exposure of the basic thermostats to temperatures which properly represent the dry bulb and wet bulb conditions.

The tongue is connected through electrical contact plate 16 to one conductor 24 of an electrical circuit whose other conductor 26 runs to a fixed contact point 27, so mounted as to cooperate with the integrating tongue 17, by making or breaking contact with some point thereof. The fixed point 27 is adjustable toward and from the integrating tongue by means of a screw having a knurled head 28 and preferably having a ratchet 29 and spring pawl 30 to hold it in adjusted position; and this is mounted on an arm 31 which is pivoted on a fixed pin 32 parallel to the said direction of adjustment of the point, so that the point 27 can swing along the length of the tongue 17 toward and from the kinetic base of that tongue. The arc of travel which is possible in the particular apparatus illustrated is indicated by the slot 27′ seen in Figure 1, through which the shaft of screw 28′ can travel, said slot being in an internal guard plate 33 mounted on the removable front wall 10′. The support for the pin 32 is another projection 34 from the said front wall 10′. From this the pin 32 projects as a fixed stud, carrying an insulating bushing 35 which supports and insulates the arm 31 and point 27 to which the conductor 26 is connected. The bushing 35 is rigid with the arm 31 and has on its face end a plate with an indicator point 38 adapted to travel over a fixed scale 39, by which its various positions can be identified for future resetting. When this arm 31 has been swung to the desired position of adjustment of point 27 toward or from the base of tongue 17, as seen in Figures 1 and 2, it may be clamped in the desired position by the knurled nut 36, turning on pin 32.

In the apparatus thus arranged the thermostats may be made of any desired component parts, and the integrating tongue may be of the same composition as they, or may be different, according to what is desired. In the apparatus illustrated it may be understood that the side of each of the U's which is on its interior is of brass, and that on its exterior of steel, these two being secured intimately and fixedly together in the usual manner; and that the integrating tongue 17 has steel on the side toward the point 27 and brass on its other side, so that with increase of temperature it curves toward the point 27.

To understand the operation, it may be assumed that the basic thermostats 13 and 14 are alike in strength, and in sensitiveness and reaction to temperature changes. A decrease of relative humidity will cause increase of evaporation from the wick at thermostat 13, and so, by cooling this thermostat more than thermostat 14 will throw the kinetic base 15 toward the fixed point. When it thus moves far enough for a contact to be made, the electric current which then flows can set in motion humidifying apparatus, or can change the setting of a damper, or can do whatever else is provided.

The apparatus is independent of mere changes of atmospheric temperature, because those changes affect the basic thermostats equally and oppositely. The expansion which accompanies a change of temperature from 50 degrees to 80 degrees, for example, assuming that there is no change of relative humidity, as for example where the latter is at 100 per cent at both temperatures, leaves the kinetic base 15 equidistant from the fixed bases 13′ and 14′, and at an unchanged distance from the fixed control point 27. The expansion of the thermostats which actually occurs in such a change of temperature may find its relief in the greater bulging of each U, or in the projection of the kinetic base 15 further from the curves of the U's; or in the distortion of the legs; but in either case it is so small as not to be observable in tests which I have thus far made, and it does not affect the operation of the instrument appreciably. But when any other than 100 per cent value of relative humidity is to be maintained constant, or when any particular fibre regain is to be maintained constant at varying temperatures of atmosphere, the wet bulb depression which pertains to that desired constant value differs at differing temperatures. It is known, however, first, that the differential of the wet bulb depression per degree of temperature change has a different value for each particular percentage of humidity in the air, or of regain of certain fibers, which is to be maintained constant while the temperature varies, and, second, that the differential for each such percentage or regain is constant for all temperatures within the range of industrial operations. The integrating tongue curves towards its side on which the fixed point of control 27 is mounted, with increase of temperature, and with its successive points moving each a distance, per degree of change, which increases all the way from zero at its base to a maximum at its tip. Therefore, a point may be found somewhere along its length whose movement will make any certain desired addition, per degree of temperature increase, to that wet bulb depression which the base 15 indicates at the moment, be the depression large or small, moving or stationary; and be the room temperature high or low. The length of tongue 17, its width, and the length and position of slot 27', and throw of the arm 31, should be so arranged that the points which it will be desired to use lie within the range of adjustment of the control point 27 which is permitted by the said slot. This may be found in the first instance, for any apparatus, by experience; and can then be reproduced by setting with the pointer 38 and scale 39. The distance which the point 27 should be set from the tongue can be determined in like manner.

These positions of the control point 27 being properly set, increase of atmospheric temperature without change of humidity will cause an increase of wet bulb depression and will set the kinetic base 15 toward the control point 27, to the extent which is due to increase of wet bulb depression, while the coincident increase of atmospheric temperature will set the selected working point of the tongue, (being that point of the tongue which is opposite the space where the fixed point 27 is set) a further amount toward the fixed contact point 27 according to the rate which is proper for maintaining the desired constant relative humidity or regain. If there be only a decrease of humidity without change of temperature, the kinetic base alone will move the kinetic working point; and if there be increase of temperature without change of wet bulb depression, the increase of temperature will move the kinetic working point on the integrating tongue toward the fixed contact point enough to represent the desired differential of further humidity which is required by the law which it is desired to follow.

While the apparatus herein shown for illustration is arranged to work with an electric circuit, and as such works with a make and break arrangement, any suitable electrical means might be employed, or any suitable means other than electrical, in which the control is attained by the relative movement of the kinetic working point on the tongue toward and from the set point, or by its tendency thus to move, resulting in greater or less pressure toward it.

One method of calibrating the apparatus of the invention so that it will operate to give the stated results, for example, to maintain 80 degrees of relative humidity, at varying temperatures, would be to have two rooms in both of which the air is say at the desired 80 degrees of relative humidity and between which the temperature varies considerably, for example 50 degrees in one of them, and in the other being say 85 degrees. The apparatus may be placed first in one and then in the other, with changes in the setting of the point 27 being made until a position for that point is found in which, with the point unmoved, the instrument registers that the desired conditions prevail when placed in each room. This point being marked on the plate 39 and the position of the screw 28 being suitably noted as by a scale and pointer (not shown) the apparatus can be reset at any time so as to give impulses, automatically, to the apparatus which it controls tending to bring about such condition and to maintain it under all conditions of temperature. By a similar procedure the settings for other percentages of relative humidity may be ascertained and the settings for specific regain humidities; and each may be marked upon the instrument, or such of them as will suffice to guide the operator in setting the instrument for those which are desired.

The apparatus is especially adapted to resist mill vibrations. For this purpose the apparatus should be set with the plane of its integrating tongue parallel to the observed plane in which vibrations occur at the locality where it is to be placed.

I claim as my invention:

1. Apparatus of the class described comprising a pair of thermostats, one of which is exposed to dry bulb and one to wet bulb temperatures, arranged with their kinetic ends secured together and opposing each other, thereby constituting a kinetic base expressing wet bulb depression combined with a thermostat mounted on said base.

2. Apparatus of the class described comprising a pair of thermostatic strips, one of which is exposed to dry bulb and one to wet bulb temperatures, arranged with their kinetic ends secured together and opposing each other, thereby constituting a kinetic base expressing wet bulb depression; and a thermostatic strip mounted on the kinetic base, having an integrating point at a distance therefrom such that its displacement, caused by variations of temperature, conforms to the relation during varying temperature, of the wet bulb depression, for some certain constant condition of humidity, to a constant wet bulb depression.

3. Apparatus of the class described comprising a pair of thermostatic strips, one of which is exposed to dry bulb and one to wet bulb temperatures, arranged with their kinetic ends secured together and opposing each other, thereby constituting a kinetic base expressing wet bulb depression; and a thermostatic strip mounted on the kinetic base, having an integrating point at a distance therefrom such that its displacement, caused by variations of temperature, conforms to the relation during varying temperature, of the wet bulb depression, for some certain constant condition of humidity, to a constant wet bulb depression; combined with a device, fixed in position to cooperate with said integrating point for controlling supply of moisture according to the relative position of said fixed device and said integrating point.

4. Apparatus of the class described comprising a pair of thermostatic strips, one of which is exposed to dry bulb and one to wet bulb temperatures, arranged with their kinetic ends secured together and opposing each other, thereby constituting a kinetic base expressing wet bulb depression; and a thermostatic strip mounted on the kinetic base, having an integrating point at a distance therefrom such that its displacement, caused by variations of temperature, conforms to the relation during varying temperature, of the wet bulb depression, for some certain constant condition of humidity, to a constant wet bulb depression; combined with a device, fixed in position to cooperate with said integrating point for controlling supply of moisture according to the relative position of said fixed device and said integrating point; the said fixed device being adjustable to different positions in the line of travel of the integrating point thereby to set the apparatus for maintaining a selected wet bulb depression at a given temperature.

5. Apparatus of the class described comprising a pair of thermostatic strips, one of which is exposed to dry bulb and one to wet bulb temperatures, arranged with their kinetic ends secured together and opposing each other, thereby constituting a kinetic base expressing wet bulb depression; and a thermostatic strip mounted on the kinetic base, having an integrating point at a distance therefrom such that its displacement, caused by variations of temperature, conforms to the relation during varying temperature, of the wet bulb depression, for some certain constant condition of humidity, to a constant wet bulb depression; combined with a device, fixed in position to cooperate with said integrating point for controlling supply of moisture according to the relative position of said fixed device and said integrating point; there being a plurality of said integrating points on the tongue at differing distances from the base, and the said fixed device being adjustable so as to cooperate with any of them whereby the apparatus can be set to follow any selected one of a plurality of certain constant conditions of humidity through varying temperatures.

6. Apparatus of the class described comprising a pair of thermostatic strips, one of which is exposed to dry bulb and one to wet bulb temperatures, arranged with their kinetic ends secured together and opposing each other, thereby constituting a kinetic base expressing wet bulb depression; and a thermostatic strip mounted on the kinetic base, having an integrating point at a distance therefrom such that its displacement, caused by variations of temperature, conforms to the relation during varying temperature, of the wet bulb depression, for some certain constant condition of humidity, to a constant wet bulb depression; combined with a device, fixed in position to cooperate with said integrating point for controlling supply of moisture according to the relative position of said fixed device and said integrating point; there being a plurality of said integrating points on the tongue at differing distances from the base, and the said fixed device being adjustable so as to cooperate with any of them whereby the apparatus can be set to follow any selected one of a plurality of certain constant conditions of humidity through varying temperatures; there being a pivot on which a part of the said device is mounted, arranged to guide said device along the tongue to different distances from the kinetic base, for said adjustment; and clamping means.

7. Apparatus of the class described comprising a pair of thermostatic strips, one of which is exposed to dry bulb and one to wet bulb temperatures, arranged with their kinetic ends secured together and opposing each other, thereby constituting a kinetic base expressing wet bulb depression; and a thermostatic strip mounted on the kinetic base, having an integrating point at a distance therefrom such that its displacement, caused by variations of temperature, conforms to the relation during varying temperature, of the wet bulb depression, for some certain constant condition of humidity, to a constant wet bulb depression; combined with a device, fixed in position to cooperate with said integrating point for controlling supply of moisture according to the relative position of said fixed device and said integrating point, there being a plurality of said integrating points on the tongue at differing distances from the base, and the said fixed device being adjustable so as to cooperate with any of them whereby the apparatus can be set to follow any selected one of a plurality of certain constant conditions of humidity through varying temperatures; and the said fixed device having its point for contact with the integrating point screw-mounted for motion in the line of travel of the said integrating point.

8. Apparatus of the class described comprising a pair of thermostatic strips, one of which is exposed to dry bulb and one to wet bulb temperatures, arranged with their kinetic ends secured together and opposing each other, thereby constituting a kinetic base expressing wet bulb depression; and a thermostatic strip mounted on the kinetic base, having an integrating point at a distance therefrom such that its displacement, caused by variations of temperature, conforms to the relation during varying temperature, of the wet bulb depression, for some certain constant condition of humidity, to a constant wet bulb depression; said strip mounted on the base being a conductor of electricity with lateral exposure; combined with an electric circuit having one contact fixed in position for co-operating with the side of the strip.

9. Apparatus of the class described comprising a pair of thermostatic strips, one of which is exposed to dry bulb and one to wet bulb temperatures, arranged with their kinetic ends parallel, secured together, moving laterally and opposing each other, thereby constituting a kinetic base expressing wet bulb depression; and a thermostatic strip mounted on said base and parallel to said ends.

10. Apparatus of the class described comprising a pair of thermostatic strips, one of which is exposed to dry bulb and one to wet bulb temperatures, arranged with their kinetic ends secured together and opposing each other, thereby constituting a kinetic base expressing wet bulb depression; and a thermostatic strip mounted on the kinetic base extending in the direction of the first mentioned strips, and having an integrating point at a distance therefrom such that its movement with respect to the kinetic base, caused by variations of temperature, conforms to the relation of the wet bulb depression for some certain constant condition of humidity to a constant wet bulb depression during varying temperature.

11. Apparatus of the class described comprising a pair of thermostatic strips, one of which is exposed to dry bulb and one to wet bulb temperatures, arranged with their kinetic ends secured together and opposing each other, thereby constituting a kinetic base expressing wet bulb depression; said strips being of U-shape; and a thermostatic strip mounted on the kinetic base extending in the direction of the first mentioned strips, and having an integrating point at a distance therefrom such that its movement with respect to the kinetic base, caused by variations of temperature, conforms to the relation of the wet bulb depression for some certain constant condition of humidity to a constant wet bulb depression during varying temperature.

12. Apparatus of the class described comprising a pair of thermostatic strips, one of which is exposed to dry bulb and one to wet bulb temperatures, arranged with their kinetic ends secured together and opposing each other, thereby constituting a kinetic base expressing wet bulb depression; said strips being of U-shape; and the said U's having each a prolonged limb, and these two constituting the opposing kinetic ends.

13. Apparatus of the class described comprising three thermostats, two of which are equal and opposite in action and are subjected respectively to wet bulb and dry bulb temperatures, forming a kinetic base responding to wet bulb depression, and the third of which is mounted on said kinetic base and is subjected to dry bulb temperatures, having a point whose thermostatic movement integrates the existing wet bulb depression in terms of the existing temperature and in relation to the law of some certain constant condition of humidity; combined with a fixed device whose position represents said constant condition, in relation to said integrating point.

14. Apparatus of the class described, comprising a pair of joined and opposed thermostats, means whereby they are subject respectively to wet bulb and dry bulb temperatures; the point of their juncture having an integrating thermostat, which superadds to their joint indication a correction for temperature; and a device, with which the integrating thermostat cooperates, for controlling apparatus affecting humidity.

15. Apparatus of the class described comprising two thermostats, one exposed for dry bulb and the other for wet bulb temperature reactions, these thermostats being parallel and opposed to each other at their kinetic ends; and a third thermostat, mounted on the said kinetic ends of both, parallel to them, extending further in the same direction, and arranged to be the expressive operative portion of the thermostatic combination, whereby a temperature correction is added to the indication made by the first mentioned thermostats.

16. Apparatus of the class described comprising two thermostats, one exposed for dry bulb and the other for wet bulb temperature reactions, these thermostats being parallel and opposed to each other at their kinetic ends; and a third thermostat, mounted on the said kinetic ends of both, parallel to them, extending further in the same direction, and arranged to be the expressive operative portion of the thermostatic combination, whereby a temperature correction is added to the indication made by the first mentioned thermostats; and means to select the degree of temperature correction that shall be made, by selecting among portions of the third thermostat which move at different rates for the same temperature change.

17. In apparatus of the class described, wet and dry bulb thermostats arranged with their kinetic ends coacting to express wet bulb depression, combined with an integrating thermostatic tongue, mounted with its base on the said coacting ends and responsive to temperature to correct their indication according to a law of some certain constant humidity condition.

18. In apparatus of the class described, wet and dry bulb thermostats arranged with their kinetic ends coactive for expressing wet bulb depression independent of variations of temperature combined with an integrating thermostatic tongue mounted on the said coactive ends and adapted to superadd thereto a correction for temperature according to a law of some certain constant humidity condition.

Signed at Providence, Rhode Island, this 19th day of May, 1923.

ALBERT J. LOEPSINGER.